Aug. 17, 1948.  F. D. PRAGER  2,447,477
AUTOMATIC ZEOLITE SOFTENER
Filed Oct. 12, 1942  7 Sheets-Sheet 7
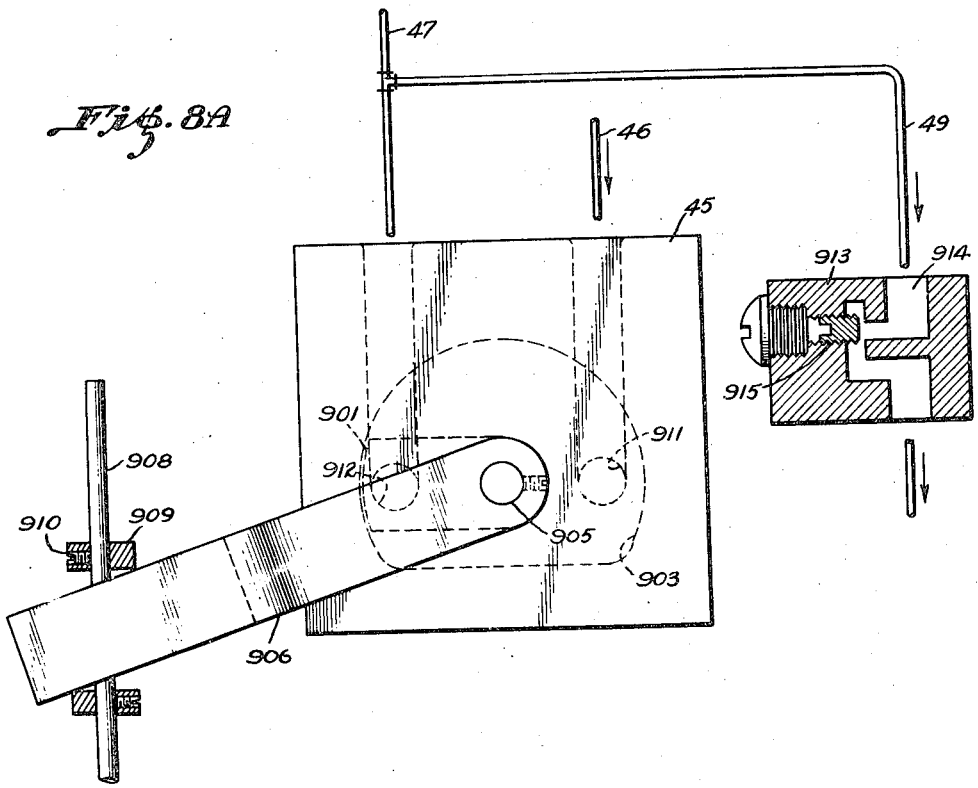
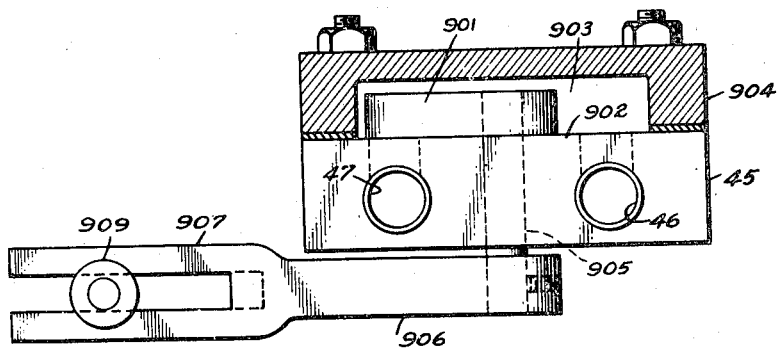
Inventor:
Franz D. Prager

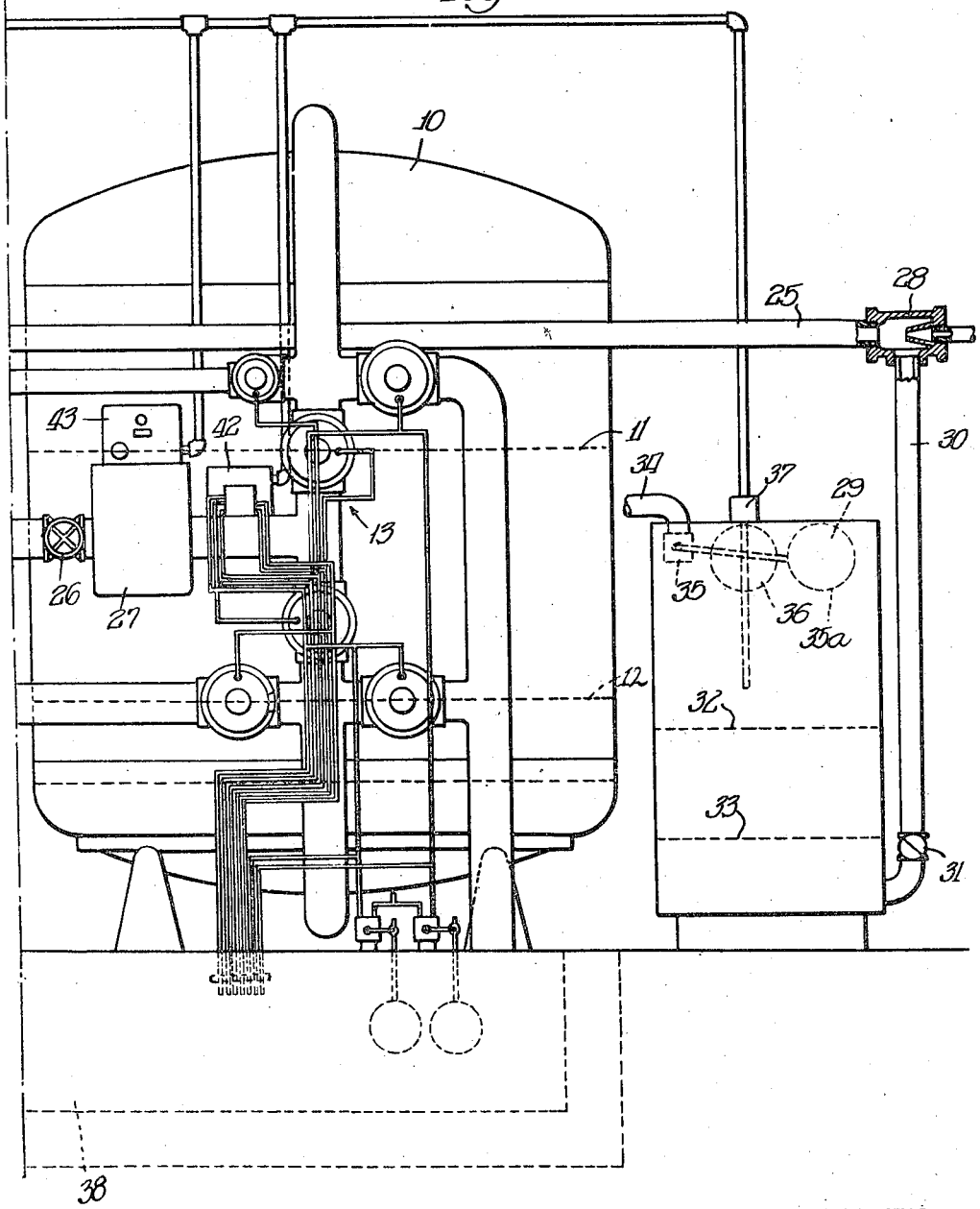

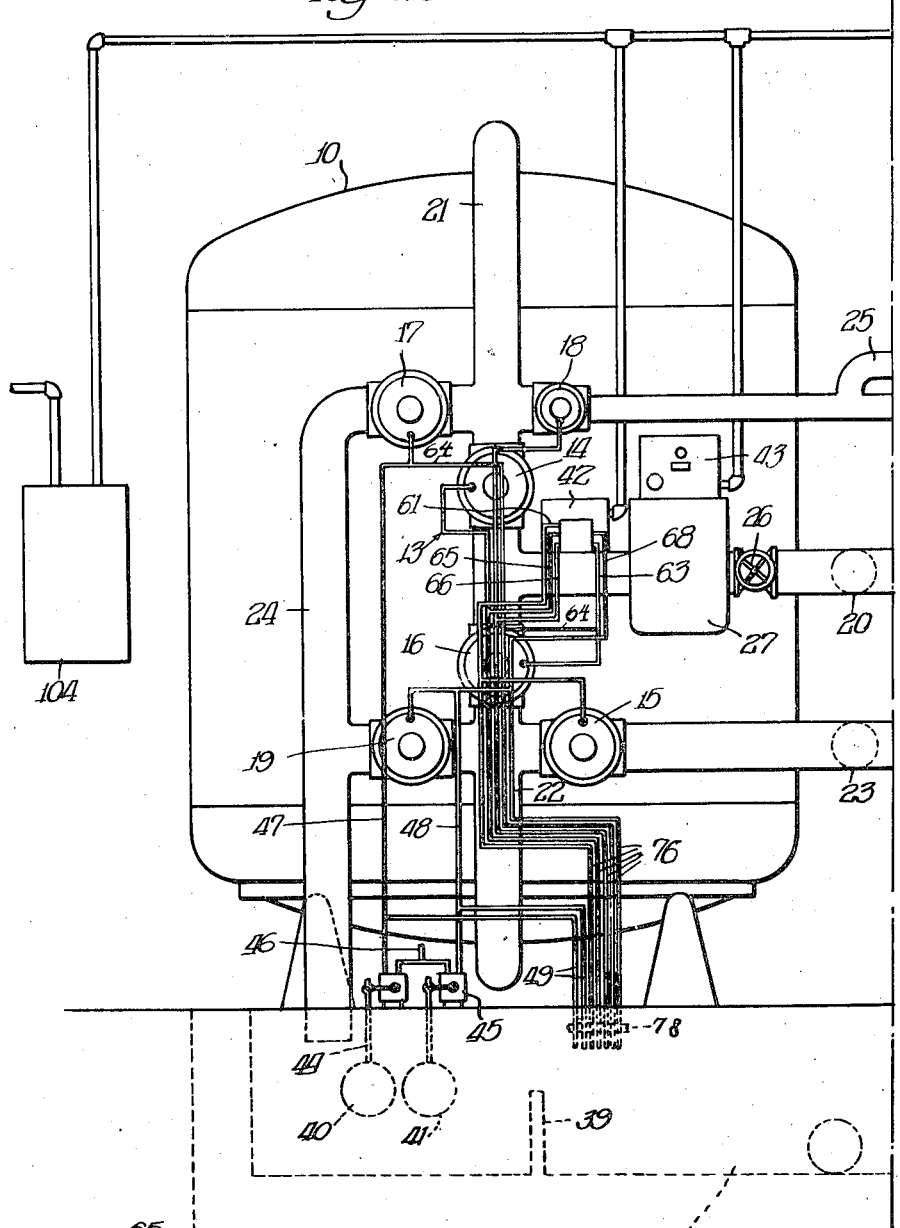
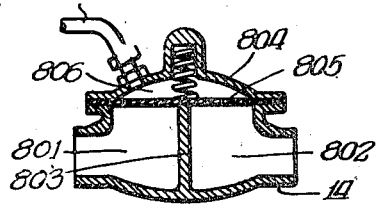

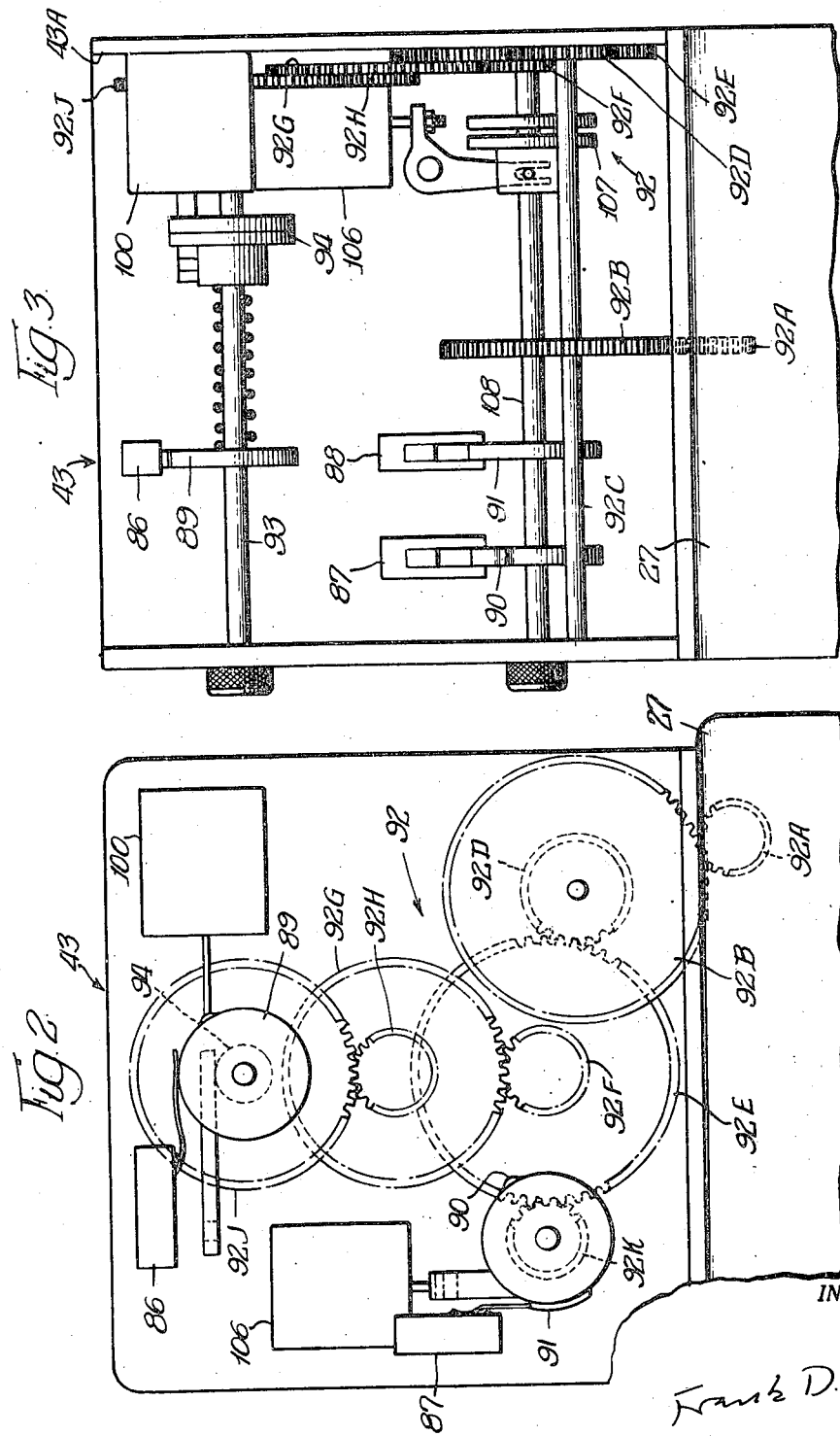

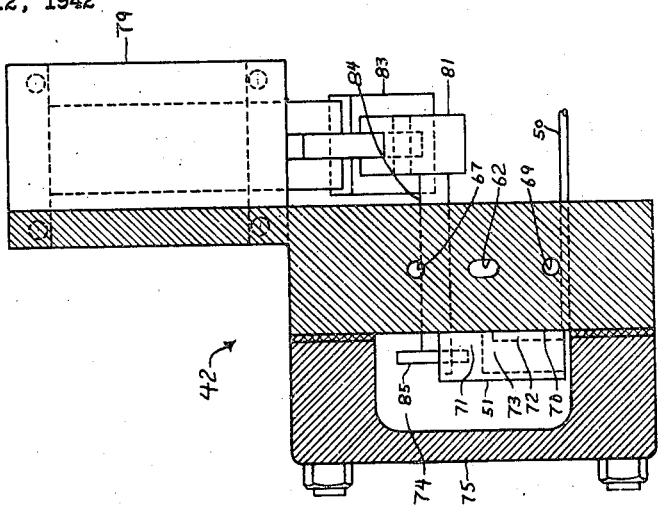
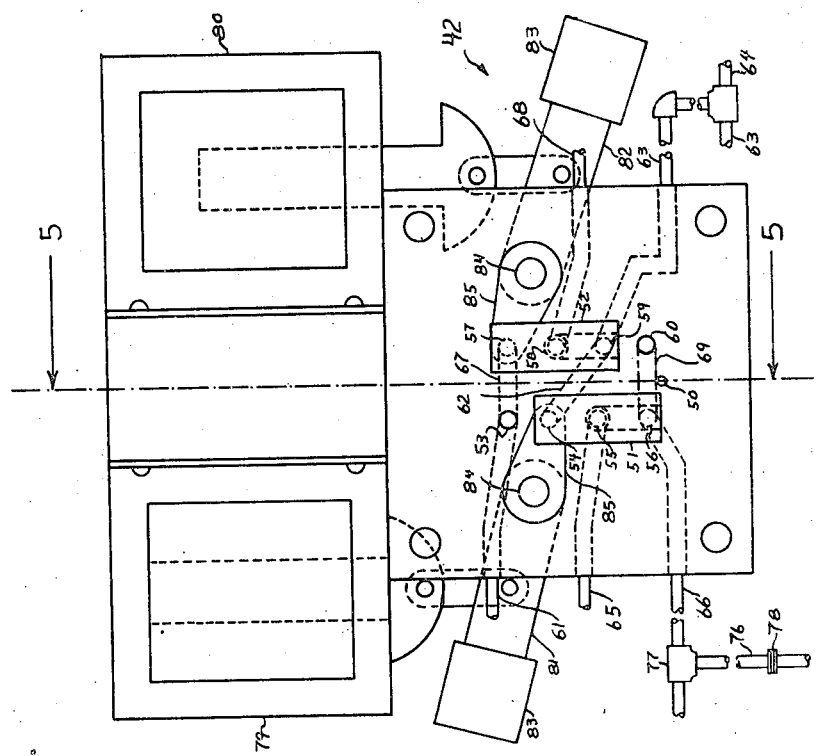

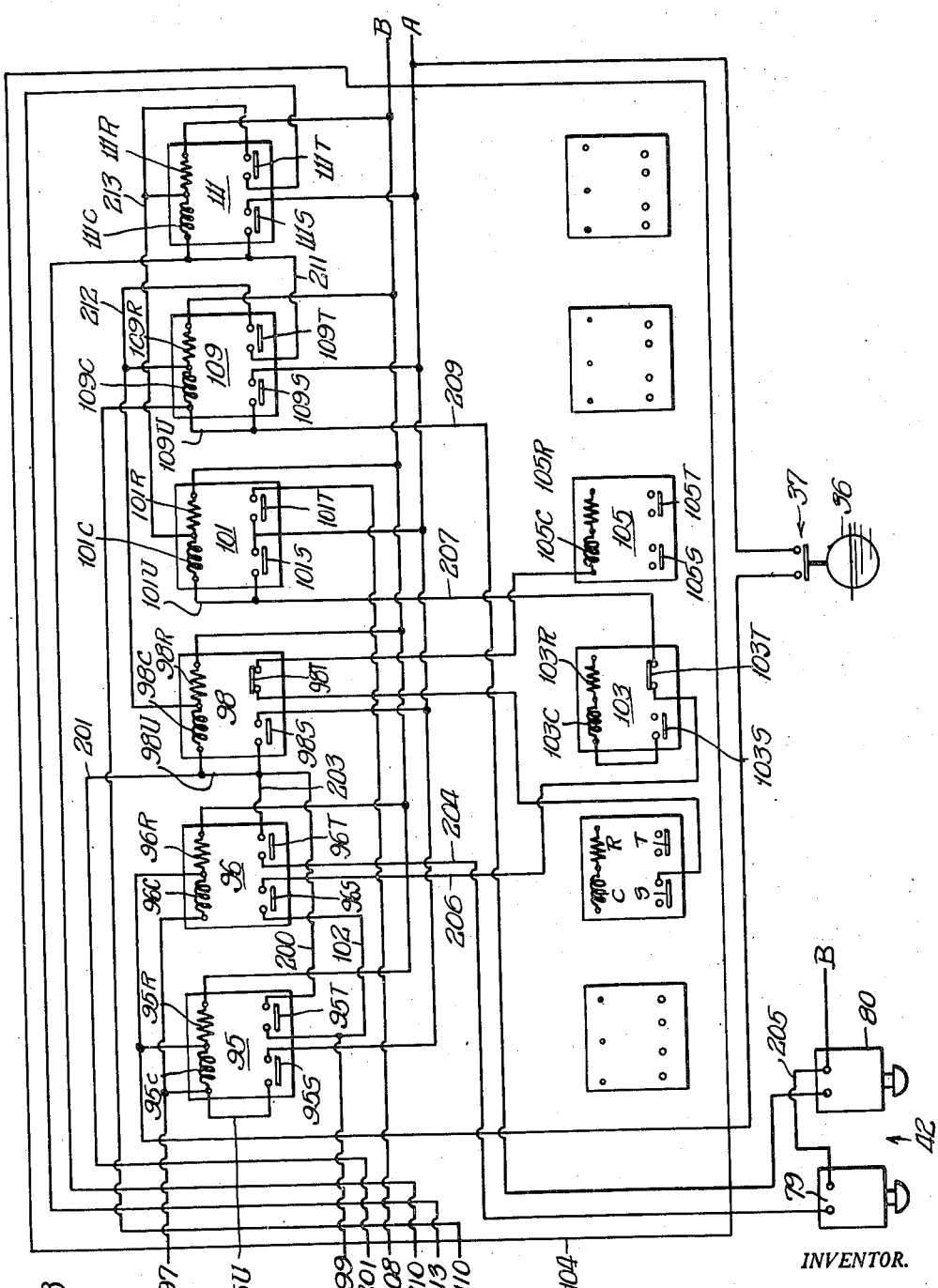

UNITED STATES PATENT OFFICE 2,447,477

AUTOMATIC ZEOLITE SOFTENER

Frank D. Prager, Chicago, Ill., assignor to Graver Tank & Mfg. Co., Inc., a corporation of Delaware Application October 12, 1942, Serial No. 461,804

2 Claims. (Cl. 210—24)

This invention relates to automatic zeolite softeners, filters and the like.

It is an object of this invention to provide a device of the type referred to, wherein all operating valves are individually controlled by a single pilot valve unit which comprises only two moveable valve members.

Another object is to provide a device of the type referred to, which is controlled by a simplified arrangement of program switches, comprising only four electric switches for the complete operating and indicating program of a zeolite softener, and three electric switches in the case of a filter.

Another object is to reduce the number and to improve the arrangement of the parts and mechanisms controlling a complete automatic program cycle, particularly eliminating all synchronous motors, clocks, hardness or pH testers, turbidity detectors, and the like, and using merely the standard water meter, which is always required, and which is very simply adapted to actuate the necessary switches and further control elements, in manner involving only the use of standard gears, electric magnets, and other standard parts, and eliminating all articles of special manufacture.

Another object is to provide a device of the type referred to, wherein the various positions of the apparatus are indicated by a simple, rotating dial and the same dial can be used to vary said positions, whereby the program cycle can be retarded or accelerated at will.

Other objects are to provide improved valve nests, improved hydraulic operators for the same, improved electric controls for the hydraulic operators, and suitable interlocking means for batteries of two or more units.

Still other objects may become apparent from the following disclosure.

In the drawing:

Figure 1A is a partial front elevation of an automatic softener plant incorporating this invention.

Figure 1B is a similar view, completing this embodiment.

Figure 2 shows in detail the meter control device forming part of the plant of Figure 1B in front elevation with the front plate and other parts removed.

Figure 3 shows the detail of Figure 2 in side elevation.

Figure 4 shows in detail the pilot unit forming part of the plant of Figure 1B, with the cover and bonnet thereof removed, in front elevation.

Figure 5 shows the detail of Figure 4 in sectional side elevation;

Figure 6B is a similar diagram, completing that of Figure 6A into a complete diagram of said connections, and showing primarily that part of such connections that is contained in or closely associated with the relay box and pilot unit shown in Figure 1B.

Figure 7 is an enlarged detail of Figure 1B, showing a diaphragm valve in longitudinal section.

Figure 8A is another enlarged detail of Figure 1B, showing a rate of flow controlling pilot valve and associated parts in front elevation; and Figure 8B is a plan view, partly in section, of the valve shown in Figure 8A.

Figure 6A:
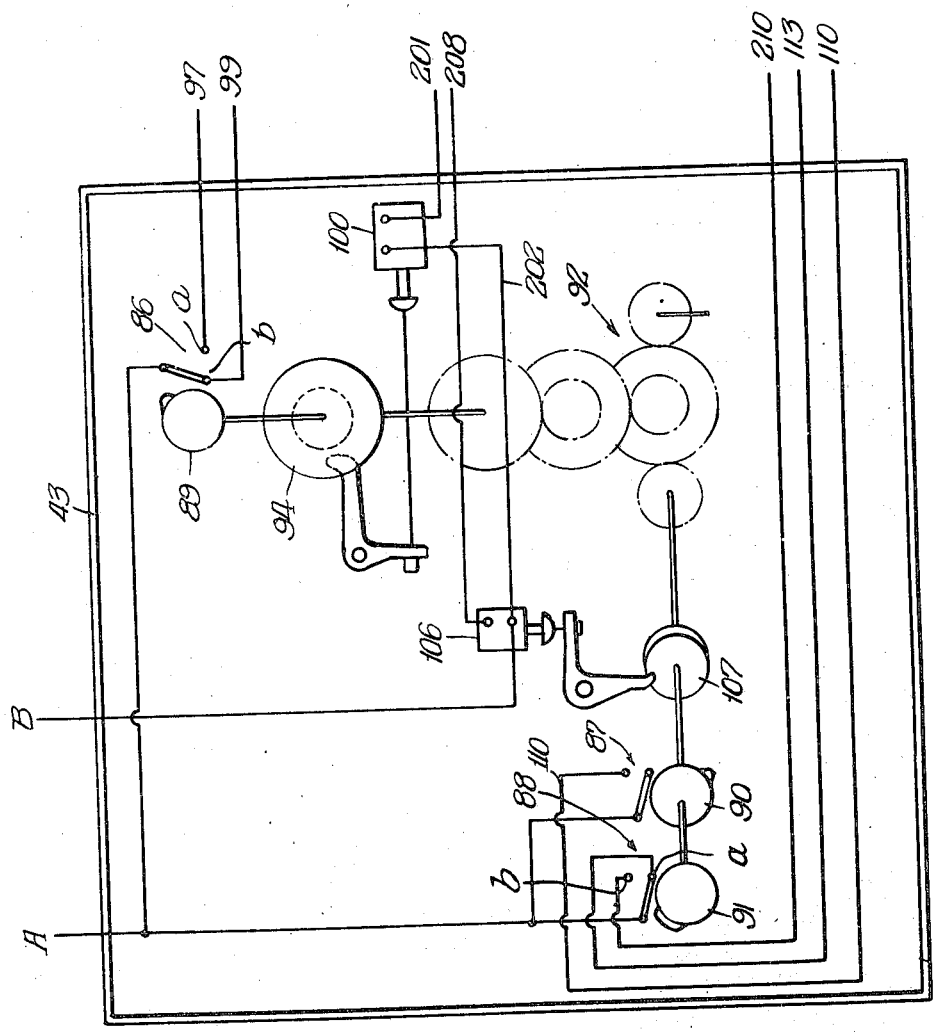
Figure 6A is a partial diagram of electric connections in the apparatus of Figure 1B showing primarily that part of such connections that is contained in the meter control device of Figure 1B.

Two softener tanks 10 are shown, each of which contain a bed of zeolite 11 supported on gravel 12. The water is supplied to each softener and withdrawn from the same by a valve nest or system 13 of pipes and fittings with six hydraulic, self-opening diaphragm valves 14, 15, 16, 17, 18 and 19 interposed thereon. These valves and the respective pipes may be identified as follows:

Influent valve 14 connects supply pipe 20 with top pipe 21.

Service valve 15 connects bottom pipe 22 with service pipe 23.

Backwash valve 16 connects supply pipe 20 with bottom pipe 22.

Waste valve 17 connects top pipe 21 with waste pipe 24.

Brine valve 18 connects brine pipe 25 with top pipe 21.

Rinse valve 19 connects bottom pipe 22 with waste pipe 24.

Each diaphragm valve comprises an inlet port 801, an outlet port 802, a partition 803 between said ports, a bonnet 804, and a diaphragm 805 separating a hydraulic pressure chamber 806 in the bonnet from the two ports, and adapted to allow or to break, communication between the ports.

A manual gate valve 26 may be interposed on the supply pipe 20 ahead of the valve nest 13, to be closed in case of repairs. Between the valve 26 and the valve nest 13, a water meter 27 is interposed on the supply pipe 20.

The brine pipe 25 incorporates a hydraulic ejector 28 which draws concentrated brine from a brine storage and measuring tank 29 through a tube 30 which is protected against reverse flow by a check valve 31 interposed thereon. The brine tank is normally kept full of concentrated brine by maintaining therein a supply of salt 32 on a bed of gravel 33, and adding makeup water through a small pipe 34 and float valve 35. The several flows are so arranged that a predetermined amount of brine is withdrawn from the brine tank 29 by the ejector 28 when the brine valve 18 is open, while a smaller predetermined amount of makeup water enters the brine tank through the float valve 35 controlled by float 35—A, riding on the surface of the brine in tank 29. Accordingly, a further float 36, which rides on the surface of the brine in the tank 29, is lowered at a predetermined rate as the brining operation goes on. When this float reaches a predetermined low position it operates a switch 37, which automatically terminates the brining operation, in manner to be described hereinafter. The float valve 35 is open at such time, so that the brine tank is gradually refilled. When the brine tank is full, the float valve 35 closes, and the brine tank is prepared for another brining operation.

The softener waste and rinse diaphragm valves 17 and 19 discharge into a sump 38, ahead of a weir or orifice plate 39 in said sump, whereby a predetermined liquid level is maintained in the sump, in response to a predetermined rate of flow through the waste pipe 24. Two floats 40 and 41 ride on the liquid level in the waste sump 38 ahead of the plate 39. These floats serve to control the flow rate through the waste and rinse diphragm valves 17 and 19, in manner to be described hereinafter.

The six diaphragm valves 14 to 19 are primarily used as shut-off valves, and their operation to such effect is hydraulically controlled by a program pilot unit 42 which in turn may be controlled electrically by a meter control unit 43 on the flow meter 27. The group of six diaphragm valves is controlled through a cycle of four positions, which may be tabulated as follows:

|  | Valve | | | | | |
| --- | --- | --- | --- | --- | --- | --- |
|  | 14 | 15 | 16 | 17 | 18 | 19 |
| Service Position | Open | Open |  |  |  |  |
| Backwash Position |  |  |  |  |  |  |
| Brining Position |  |  | Part Open | Part Open |  |  |
| Rinse Position | Open |  |  |  | Open | Open. Part Open. |

Except as indicated in the foregoing schedule, the diaphragm valves 14 to 19 are kept closed.

In the backwash and rinse positions, as noted in the foregoing schedule, the valves 17 and 19, respectively, are kept partly open, and the valve 16 is kept partly open together with the valve 17. This feature of opening certain valves only partly is introduced for the purpose of providing a simplified and improved control of the respective rates of flow. Heretofore, separate valves of the butterfly or similar types have generally been used for this flow control. In the present system, each of the floats 40 and 41 in the waste sump 38, by means of linkage 44, controls a two-way control pilot valve 45. Each pilot valve has a pressure supply 46, and has joined to it a pressure transfer tube 47, 48, leading to the diaphragm chamber of the respective hydraulic valve 17 or 19. Each tube 47 and 48 has a restricted branch connection 49 leading to the waste sump 38, below the plate 39.

These pilot valves are shown as conventional rotary valves; details will be apparent from Figures 8A and 8B.

Each pilot valve has a rotatable valve member 901 slidably disposed in contact with a seat member 902, within a valve chamber 903 formed by said seat member and by a bonnet 904. Each valve member can be caused to perform a rotating, rocking movement by a valve stem 905 passing through the seat member, and to which the valve member is secured. Each stem in turn has a lever 906 secured to it, the free end of which is bifurcated, as at 907. Each float 40 and 41 has a float rod 908 secured to and upstanding from it and passing between the prongs of the bifurcated lever 907. These float rods and levers form the linkage 44; the rods engaging the levers by collars 909 adjustably secured to the rods, as by set screws 910. The pressure supply 46 communicates with each pilot valve chamber by an open part 911 in the seat plate, so that the valve chamber 903 is constantly filled with water, under a certain pressure. A second port 912 in the seat plate is covered by the valve member 901 when this member, together with the lever 906 and float 40 or 41, is at a predetermined, low position; the valve member 901 gradually uncovers this second port 912 as the float rises. Each port 912 communicates with one of the pressure transfer tubes 47, 48.

Each branch connection tube 49 has interposed thereon a small restricting member 913. Member 913 is formed of metal, and is traversed by a passage 914. This passage is adjustably restricted by a member such as screw 915.

By proper adjustment of each set of collars 909, a predetermined rise of the waste float 40 or 41 over a certain position causes the respective lever 906 and member 901 to rise, whereby port 912 is gradually uncovered and control pilot 45 admits pressure fluid to the respective diaphragm valve 17 or 19. This tends to close that diaphragm valve, against its self-opening tendency. The result is a reduction of flow, and drop of the float 40 or 41, until the proper flow rate is established. At that point the control pilot 45 cuts off the pressure supply between the source 46 and the diaphragm valve 17 or 19. The self-opening tendency of the diaphragm valve causes the same to expel water from the respective diaphragm chamber, through the branch 49. When, as a result, the flow rate in the respective pipe exceeds the predetermined value again, the float rides high again, and the valve is biased towards closed position again. Thus, the flow rates in the waste valves 17 and 19 are maintained close to predetermined values, corresponding to predetermined positions of the floats 40 and 41. It will be understood, of course, that the speed and accuracy of this control depend on the prevailing pressures, the size of the restriction in the branch 49, and other obvious elements.

The program pilot unit 42 controls the closing and opening of the diaphragm valves 14 to 19 by admitting hydraulic pressure to the proper diaphragm chambers, and cutting the chambers off from pressure. For this purpose, a pressure tube 50 communicates with transmission tubes to the diaphragm valves, through the ports of the program pilot, when the ports are uncovered by sliding valve members 51 and 52, associated therewith. There are eight pilot ports, 53, 54, 55, 56, 57, 58, 59, and 60, which are correlated with the several diaphragm valves by transmission tubes and ducts in the following manner.

Port 53 under member 51 is connected to valve 15 by tube 61.

Port 54 under member 51 is connected to valves 16, 17, by duct 62 and tubes 63, 64.

Port 55 under member 51 is connected to valve 14 by tube 65.

Port 56 under member 51 is connected to valve 18 by tube 66.

Port 57 under member 52 is connected to valve 15 by duct 67 and tube 61.

Port 58 under member 52 is connected to valve 19 by tube 68.

Port 59 under member 52 is connected to valves 16, 17, by tubes 63, 64.

Port 60 under member 52 is connected to valve 18 by duct 69 and tube 66.

The tubes may consist of copper tubing or the like, while the ducts may be formed in the body of the pilot valve unit itself.

It will be noted that the six diaphragm valves are connected to the eight pilot ports by four simple tubes 61, 65, 66, and 68, and a fifth tube 63 which has, instead of a sixth independent tube, the branch 64. These tubes are used as hydraulic power supply conduits to the diaphragm valves. It will also be noted that there are three interconnecting ducts 62, 67, and 69 between three of the four pairs of pilot ports. There are only two movable valve members, 51 and 52.

The said ports are arranged in two parallel rows of four, in the sequence of the above tabulation, wherein the ports under either valve member 51 and 52 form a vertical row. The ports of each row are uniformly spaced from one another.

The duct 67 connects the uppermost or No. 1 port of the row under the slide member 51 with the uppermost or No. 1 port of the other row; that is, it interconnects the ports 53 and 57. Similarly, the duct 69 connects the lowermost or No. 4 port of the row under the slide member 51 with the lowermost or No. 4 port of the other row; that is, the ports 56 and 60. The third and last duct 62 differs slightly; it connects diagonally the No. 2 port of the row under the slide member 51 with the No. 3 port of the other row; that is, the ports 54 and 59. The last two ports 55 and 58 are not interconnected by ducts. All ports are separate from each other except so far as they are interconnected by the said ducts.

Each slide member 51 and 52, as shown in Figure 4, slides over the face 70 of the program pilot valve 42 wherein the several ports are formed. Each slide member 51 and 52 contacts the face 70 by two solid portions 71 and 72, which are spaced from one another by an open portion or passage 73. This passage communicates with the hydraulic pressure chamber 74 below the bonnet 75 of the program pilot valve. The distances between centers of the solid and open portions of the slide members are equal to the distances between centers of the ports of a row. Each member 51 and 52 has a raised and a lowered position, in each of which the solid portions 71 and 72 of the slide member cover two of the four pilot ports in the respective row, which are spaced by one of the other two of the four pilot ports in the respective row, said other two ports being uncovered. The arrangement of ports, solid portions and slide positions is such that in the normal, raised position, each slide member covers the odd number ports, or No. 1 and No. 3 ports, of the respective row, and uncovers the even number ports, or No. 2 and No. 4, of the same row. This setting is reversed in the lowered position of each slide member.

It will be seen that only two movable pilot valve members 51 and 52, having two positions each, are required to control a complete program of four positions for the six hydraulic softener valves. This program may be summarized as follows 1. Members 51 and 52 up: Valve 19 closed by pressure through port 58 and tube 68; valves 16 and 17 closed by pressure through port 54, duct 62 and tubes 63, 64; valve 18 closed by pressure through ports 56 and 60 and tube 66; valves 14 and 15 (inlet and service) are opened by line pressure in port 801, since they are cut off from their ports 55, 53 and 58 and accordingly have no pressure in the bonnet pressure chambers 800 service position.

2. Member 51 down and member 52 up: Valves 14, 15, 18, and 19 are closed by pressure on ports connected thereto; the valves 16 and 17 are cut off from bonnet pressure through the program pilot 42 and may only be partly closed through the respective control pilot 45, the degree of opening, due to line pressure, being adjusted by linkage 44; backwash position.

3. Members 51 and 52 down: Valves 14, 15, 16, and 17 are closed by pressure on ports connected thereto; the valves 18 and 19 cut off from bonnet pressure and opened by line pressure; brining position.

4. Member 51 up and member 52 down: Valves 15, 16, 17, and 18 are closed by pressure on ports connected thereto; the valves 14 and 19 are cut off from bonnet pressure through the program pilot 42; only valve 19 may be partly closed through the control pilot 45; rinse position.

In order to actually enable each of the self-opening valves 14 to 19 to open, when pressure for the respective valve has been cut off from the diaphragm chambers thereof, I provide each diaphragm chamber, except as hereinafter stated, with a bleeder outlet 76. These outlets may take the form of branch tubes connected to the respective pressure transmission tubes by T-connections 77, and restricted by orifice members 78, similar to the members 913, so that the hydraulic valves may open gradually or at controlled speeds. The several branch tubes 76 discharge into the waste sump 38 below the plate 39. Each of the aforementioned branches 49 of course may take the place of one such bleeder branch tube 76; and the tube 63 may have either one such branch directly connected thereto, or one for each of the branches 63 and 64.

The pilot unit 42 has two electric solenoids 79 and 80, controlling the slide members 51 and 52 respectively through levers 81 and 82. These levers are installed in the rear of the program pilot unit. Each lever is raised by the respective solenoids when the latter is energized, and each lever is lowered by a counterweight 83 when the respective solenoid is deenergized. The levers 81 and 82 control the slide members 51 and 52 on the face plate 70 by means of rocking shafts 84, which are set-screwed to the respective levers and which extend through the pilot unit at right angles to the face plate. When either solenoid 79 or 80 is energized and the respective rear lever 81 or 82 is raised, the respective slide member 51 or 52 is lowered by a front lever 85 tilted by the respective shaft 84 under the valve bonnet 75.

The two solenoids 79 and 80, which through the pilot unit 42 control the six diaphragm valves 14 to 19, are in their turn controlled by a number of switches, three-wire relays, and auxiliary mechanisms. Each three-wire relay comprises two poles S and T, a coil C, and a resistor R; and a selfholding wire U may be provided.

In addition to the aforementioned float switch 37, this system comprises three other switches 86, 87, and 88. These are controlled respectively, by cams 89, 90 and 91. The three cams are adapted to be rotated by a series or system of gears 92, driven by the flow meter 27. The gears, cams and cam switches are contained in the meter control housing 43.

This series of gears 92 may comprise a driving gear 92—A in meter 27; a gear 92—B driven by gear 92—A and substantially located in the meter control housing 43; a horizontal shaft 92—C in said housing, whereon gear 92—B is rigidly mounted; a gear 92—D rigidly mounted on shaft 92—adjacent the rear wall 43—A of said housing; additional gears 92—E, 92—F, 92—G, 92—H and 92—J, driven by gear 92—D and mounted adjacent said rear wall; said series 92—A to 92—J forming a speed reducing gear train as shown. The final gear 92—J of said gear train is rigidly mounted on horizontal starter control shaft means 93.

The meter 27 normally rotates the starter control shaft 93 forming part of system 92, through the normally closed clutch 94, interposed on the starter control shaft, between gear 92—J and starter cam 89; the latter being rigidly mounted on the starter control shaft. This cam has a single, short, raised lobe, which at a predetermined point actuates the starting switch 86. This switch is of the single pole, double throw type, and it now energizes the relays 95 and 96 through the conductor 97, since it closes the circuits A—86a—95C—95R—B and A—86—96C—96R—B.

As the relays 95 and 96 are energized they complete self-holding circuits A—95S—95U—95C—95R—B and A—95S—95U—96C—96R—B through one of their poles; they also prepare for the completion of two other relay energizing circuits and for the completion of a solenoid energizing circuit to be completed later, by means of three other poles. Thus, no actual changes in valve position result from the energizing of the relays 95 and 96 yet. However, an alarm device such as a bell or signal light (not shown) may be energized through the self-holding pole 95S of the relays 95, 96 in parallel with the relay coils 95C, 96C indicating to the plant operator or superintendent that the starting cam has begun to operate. Thus, the position of the system marked by the energizing of the relays 95 and 96 may be called the alarm position. It is the last part of the softening position.

As the starter cam 89, driven as aforesaid, thereafter reaches that position which has previously been determined to mark the 100% exhaustion of the zeolite bed, it returns the double throw starting switch 86 to its original and normal position b in which it now closes the circuit A—86b—99—95T—200—98C—98R—B and there- by energizes a third relay 98 through the conductor 99 and one of the aforementioned closed poles of the first relay 95.

As the third relay 98 is energized, it makes self-holding circuit A—98S—98U—98C—98R—B and also a circuit A—98S—201—100—202—B for a solenoid 100 in the meter control unit 43, which now opens the clutch 94, thereby stopping the starting cam 89 in the 100% exhausted position. This will enable the starting cam later on to resume rotation at the 100% or 0% position, although in the meantime, some water flows through the meter 27, incident to the backwashing and rinsing operations. Furthermore, the relay 98 makes circuit A—98S—203—96T—204—79—205—B, through the relay 96 for the solenoid 79 of the pilot unit 42. This changes the softener 10 from softening to backwashing position.

As the starting switch 86 is reversed to b to energize the relay 98 as aforesaid, it also energizes a fourth relay 101 by a circuit A—86b—99—102—96S—206—103T—207—101C—101R—B, through the conductors 99 and 102, a closed pole of the relay 96, and a further, closed, interlocking pole 103T in the relay 103 associated with the second softener unit 10. The last mentioned pole 103T is normally closed. It will be understood that ordinarily the two softeners 10 should not be regenerated at the same time. Provision is made in the present system so that, on the one hand, at least one of the two softeners 10 is always connected to the service pipe 23, but, on the other hand, the second softener can be regenerated immediately after the regeneration of the first. It will also be understood that each softener has an independent hydraulic valve system 13, pilot unit 42, meter control housing 43, and system of relays. The several relays, of course, can be contained in a common box 104. The relay 103 of the second unit corresponds to the relay 98 of the first unit as to construction, hookup, and in all other respects. If the second unit had reached the 100% exhausted position of its starting shaft 93 before the first unit, then the relay 105 of the second unit would now be energized through the relay 98 of the first unit. It is assumed, however, that the first unit reaches the 100% exhausted position first, although the time interval may amount only to a split second. After the relay 98 has been energized, upon the reaching of said 100% exhausted position of the first unit, the relay 105 of the second unit can no longer be energized, since the circuit through the normally closed pole of the rely 98 is interrupted. This interlock remains in effect until the relay 98 is deenergized, as hereinafter referred to.

The series of gears 92, as mentioned, comprises a gear 92—E mounted adjacent the rear wall 43—A. This gear drives another gear 92—K, similarly mounted, and the gears 92—A, 92—B, 92—D, 92—E, 92—K form a speed reducing gear train; the speed of gear 92—K preferably being greater than that of the aforementioned gear 92—J. Gear 92—J is rigidly mounted on horizontal shaft means 108; whereon are similarly mounted the cams 90 and 91.

As the fourth relay 101 is energized, it makes self-holding circuit A—101S—101U—101C—101R—B and also circuit A—101T—208—106—B for a solenoid 106, which now closes the normally open clutch 107 interposed on the shaft 108 between gear 92—K and the cams 90 and 91. This causes the said cams to rotate, as the backwash water flows through the meter. It will be remembered that the shaft 93 and starting cam 89 are at rest.

When a predetermined amount of backwash water has passed through the meter, the rotating function cam 90 throws a switch. This cam has a single, short, raised lobe, like the starting cam 89. At a predetermined point, the raised lobe on the function cam 90 closes the function switch 87. This switch is of the single pole, normally open type. It energizes now the fifth relay 109 through the conductor 110, by circuit A—87—110—109C—109R—B.

As the fifth relay 109 is energized, it makes self-holding circuit A—109S—109U—109C—109R—B, prepares for a relay deenergizing circuit, and also makes circuit A—109S—209—80—B for the solenoid 80 of the pilot unit 42. This changes the softener from backwashing to brining position.

When a predetermined amount of concentrated brine has been transferred from the brine tank 29 to the softener 10, the float 36 closes the float switch 37. This closes circuits A—95R—B and A—96R—B and thereby deenergizes the relays 95 and 96. This in turn, obviously, deenergizes the solenoid 79 of the pilot unit 42, changing the softener from brining to rinsing position. Thereafter, the float 36 rises again, opening the switch 37.

Incident to the rinse, water flows through the meter 27. When a predetermined amount of rinse water has passed through the meter, the rotating reset cam 91 throws a switch. This cam has an elongated raised lobe, engaging the reset switch 88. This switch is of the single pole, double throw type. It now changes to position b, closes circuit A—88b—210—111C—111R—B, and thus energizes the sixth and last relay 111 of the first softener unit 10, through the conductor 210.

As the relay 111 is energized, it makes self-holding circuit A—111S—111U—111C—111R—B, prepares a relay deenergizing circuit, and also completes circuits A—111S—211—109T—212—98R—B and A—111S—211—109T—212—109R—B, deenergizing the relays 98 and 109, through the latter relay. The deenergization of relay 109 obviously causes the solenoid 80 of the pilot unit 42 to be deenergized, changing the softener 10 from rinsing back to softening position.

The deenergization of relay 98 obviously causes the solenoid 100 to be deenergized. Thus, the clutch 94 is allowed to close again, and the shaft 93 starts another, slow rotation, measuring another operating or service cycle of the zeolite bed 11. The deenergization of relay 98 also causes the normally closed pole 98T thereof to be closed, terminating the interlock and allowing the second unit to be backwashed, regenerated, and rinsed when or if it has reached the 100% exhausted position.

While softening service is thus resumed in the first unit and back-washing may start in the second, the reset cam 91 of the first unit is still rotating. Finally, however, the raised lobe of this cam disengages the reset switch 88 and returns it to 88a. Thereupon this switch makes circuits A—88a—113—111T—213—111R—B and A—88a—113—111T—213—101R—B through conductor 113 and relay 111, deenergizing said relay and the relay 101.

The deenergization of the relay 101 obviously causes the solenoid 106 to be deenergized, allowing the clutch 107 to open and causing the function shaft 108 to stop in zero position. From this position, the function shaft can start again, causing a new backwashing operation without delay, when the 100% exhausted position has again been reached in this softening unit. It will be understood that the zero-resetting period of the function shaft, which in this manner forms the first part of the softening period, need not be of any particular length; it merely uses so much of the circumference of the function shaft 108 as is not used for the various regenerating functions.

I claim:
1. In an automatic water treatment apparatus having four operative positions, a series of hydraulically operable valve members, a hydraulic pressure chamber associated with each of said valve members, a pilot unit at least one hydraulic transmission tube entering said pilot unit and each of said pressure chambers, a pressure supply tube entering said pilot unit, a plurality of stationary ports in said pilot unit interposed between said pressure supply tube and said transmission tubes, ducts between some of said ports, two moveable pilot valve members associated with said ports, each of said moveable members being adapted in a first position to uncover some of said ports and in a second position to uncover others of said ports, and means adapted to set each of said moveable members into either of said positions, whereby a total of four pilot positions is obtained, corresponding to the said four operative positions of the water treatment apparatus.

2. An automatic water treatment apparatus of the type described in claim 1, wherein said means to set the moveable members in certain positions includes a solenoid associated with each of said moveable members, adapted when energized to hold the respective moveable member in one of the two positions thereof, means to energize each solenoid, and means associated with each of said moveable members, adapted when the respective solenoid is deenergized to hold the respective moveable member in the other of the two positions thereof.

FRANK D. PRAGER.

REFERENCES CITED

The following references are of record in the file of this patent:

UNITED STATES PATENTS

| Number | Name | Date |
| --- | --- | --- |
| 1,354,311 | Landrum | Sept. 28, 1920 |
| 1,354,604 | Duggan | Oct. 5, 1920 |
| 1,443,892 | Applebaum | Jan. 30, 1923 |
| 1,608,091 | Eisenhauer | Nov. 23, 1926 |
| 1,608,661 | Nordell | Nov. 30, 1926 |
| 1,644,469 | Green | Oct. 4, 1927 |
| 1,652,710 | Dotterweich | Dec. 13, 1927 |
| 1,787,686 | Kerr | Jan. 6, 1931 |
| 1,954,405 | Dotterweich | Apr. 10, 1934 |
| 2,051,155 | Staegemann | Aug. 18, 1936 |
| 2,056,420 | Colby | Oct. 6, 1936 |
| 2,061,797 | Eisenhauer | Nov. 24, 1936 |
| 2,065,962 | Bowers | Dec. 29, 1936 |
| 2,076,321 | Pick | Apr. 6, 1937 |
| 2,180,320 | Hansen | Nov. 14, 1939 |
| 2,217,822 | Symons | Oct. 15, 1940 |
| 2,243,815 | Griswold | May 27, 1941 |
| 2,254,782 | Riche | Sept. 2, 1941 |
| 2,255,324 | McGill | Sept. 9, 1941 |
| 2,310,978 | McGill et al. | Feb. 16, 1943 |
| 2,354,694 | McGill et al. | Aug. 1, 1944 |